US012376571B1

(12) United States Patent
McGill

(10) Patent No.: US 12,376,571 B1
(45) Date of Patent: Aug. 5, 2025

(54) INDOOR/OUTDOOR BIRD FEEDER

(71) Applicant: Apryl McGill, Kansas City, MO (US)

(72) Inventor: Apryl McGill, Kansas City, MO (US)

( * ) Notice: Subject to any disclaimer, the term of this patent is extended or adjusted under 35 U.S.C. 154(b) by 4 days.

(21) Appl. No.: 18/137,176

(22) Filed: Apr. 20, 2023

Related U.S. Application Data

(60) Provisional application No. 63/332,724, filed on Apr. 20, 2022.

(51) Int. Cl.
*A01K 39/01* (2006.01)

(52) U.S. Cl.
CPC .................... *A01K 39/01* (2013.01)

(58) Field of Classification Search
CPC ........ A01K 39/01; A01K 31/14; A01K 1/035; A01K 39/00
See application file for complete search history.

(56) References Cited

U.S. PATENT DOCUMENTS

| | | | | |
|---|---|---|---|---|
| 3,291,100 A | * | 12/1966 | Negaard | A01K 39/014 119/57.8 |
| 4,881,491 A | * | 11/1989 | Brown | A01K 39/00 119/51.01 |
| 4,953,503 A | * | 9/1990 | Lundquist | A01K 39/00 119/51.01 |
| 5,016,571 A | * | 5/1991 | Totaro | A01K 31/14 119/428 |
| 5,170,747 A | * | 12/1992 | Strangio | A01K 45/00 119/428 |
| 5,261,350 A | * | 11/1993 | Vavrek | A01K 1/0353 119/484 |
| D351,690 S | * | 10/1994 | Honeycutt | D30/124 |
| 5,493,997 A | * | 2/1996 | Ritchey | A01K 31/14 119/428 |
| 5,782,205 A | * | 7/1998 | Veras | A01K 1/035 119/484 |
| 5,890,455 A | * | 4/1999 | Donchey | A01K 1/035 119/497 |
| 5,904,330 A | * | 5/1999 | Manico | G03B 29/00 119/51.01 |
| 6,062,167 A | * | 5/2000 | Soley | A01K 39/00 119/57.8 |
| 6,314,912 B1 | * | 11/2001 | Armbruster | A01K 31/14 119/431 |
| 6,729,082 B1 | * | 5/2004 | Oldham | E06B 1/363 52/201 |
| 7,530,331 B1 | * | 5/2009 | Malachowski | A01K 1/035 119/484 |
| D658,338 S | * | 4/2012 | Law | D30/124 |
| 10,194,642 B2 | * | 2/2019 | Ellis | A01K 39/0206 |

(Continued)

*Primary Examiner* — Yvonne R Abbott-Lewis
(74) *Attorney, Agent, or Firm* — Kutak Rock LLP

(57) ABSTRACT

The present invention generally comprises indoor/outdoor bird feeder systems and methods for feeding and observing birds via a wall/door mounted indoor/outdoor bird feeder. The system and method include an inside/interior component and an outside/exterior component that fit within an opening in a wall or door. The two components are mounted within a wall or door, such that the interior component and exterior component lock together to form a single unit once installed. An advantage of the present invention is the ability to install the bird feeder of the present invention in any location. The present bird feeder system may be installed on any wall, door, or other surface.

8 Claims, 5 Drawing Sheets

(56) References Cited

U.S. PATENT DOCUMENTS

| | | | |
|---|---|---|---|
| 11,375,841 B2* | 7/2022 | Ellis | A47H 27/00 |
| 2004/0250777 A1* | 12/2004 | Stachowiak | A01K 39/012 |
| | | | 119/52.2 |
| 2015/0342153 A1* | 12/2015 | Hudepohl | A01K 39/01 |
| | | | 119/61.3 |

* cited by examiner

INDOOR/OUTDOOR BIRD FEEDER

CROSS-REFERENCE TO RELATED APPLICATIONS

This application claims priority to U.S. Provisional Patent Application Ser. No. 63/332,724, filed Apr. 20, 2022, the entire disclosure of which is incorporated herein by reference.

FIELD OF THE INVENTION

The present invention relates generally to apparatuses, systems and methods for feeding and observing birds. More specifically, the present invention relates to indoor/outdoor bird feeder apparatus and systems, and methods for feeding and observing birds via a wall/door mounted indoor/outdoor bird feeder.

BACKGROUND OF THE INVENTION

Bird watching is an extremely popular activity. Many people place bird feeders near their homes in an effort to attract birds to the area for their viewing enjoyment. Some bird feeders have even been designed to be located within a window opening, to attract birds for viewing by a person located inside their home. Such bird feeders are installed within an open window much like a window air conditioning unit, with the lower sash of a single or double hung window closed down onto the bird feeder to hold it within the window. While such window mounted bird feeders allow for in-home bird watching opportunities, many homes have fixed glass windows, or otherwise do not have single or double hung windows at locations in which it is desirable or convenient to watch birds.

Therefore, it is desirable to provide an indoor/outdoor bird feeder apparatus and systems, and methods for feeding and observing birds via a wall/door mounted bird feeder, which does not require installation within a window opening.

SUMMARY OF THE INVENTION

The present invention comprises indoor/outdoor bird feeder apparatus and systems, and methods for feeding and observing birds via a wall/door mounted bird feeder, in which a bird feeder is mounted within an opening in a wall, door or other structure.

In some embodiments, the present invention generally comprises an inside/interior component and an outside/exterior component that fit within an opening in a wall or door. The two components are mounted within a wall or door, in much the same manner as a pet door is mounted in a wall or door, with the interior component mounted to the inside portion of the wall/door, and the exterior component mounted to the exterior side of the wall or door such that the interior component and exterior component connector lock together to form a single unit once installed.

An advantage of the present invention is the ability to install the bird feeder of the present invention in any location. The present bird feeder may be installed on any wall, door, or other surface in which a cut can be made.

BRIEF DESCRIPTION OF THE DRAWINGS

A preferred embodiment of the present invention, illustrative of the best mode in which the applicant has contemplated applying the principles, is set forth in the instant description and is shown in the drawings.

DETAILED DESCRIPTION OF THE INVENTION

As required, a detailed description of the various embodiments of the present invention are disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 5:
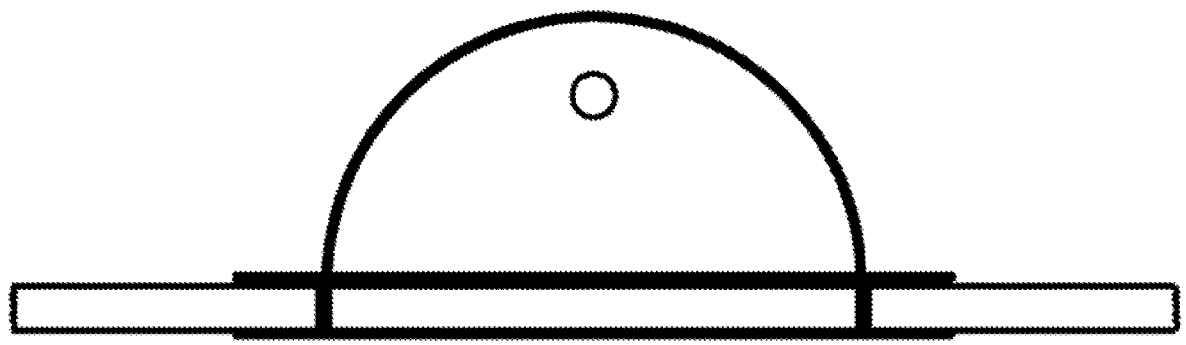
FIG. 5 shows a top view of the interior component locked together with the exterior component, after installation in one embodiment of the present invention.

An embodiment of the present invention comprises an inside interior component 100 and an outside exterior component 200 that fit within an opening in a wall or door. The two components are mounted within a wall or door, in much the same manner as a pet door is mounted in a wall or door, with the interior component 100 mounted to the inside portion 150 of the wall/door, and the exterior component 200 mounted to the exterior portion 150 of the wall or door such that the interior component 100 and exterior component 200 connector lock together to form a single unit once installed, as shown in FIG. 5.

Figure 1:
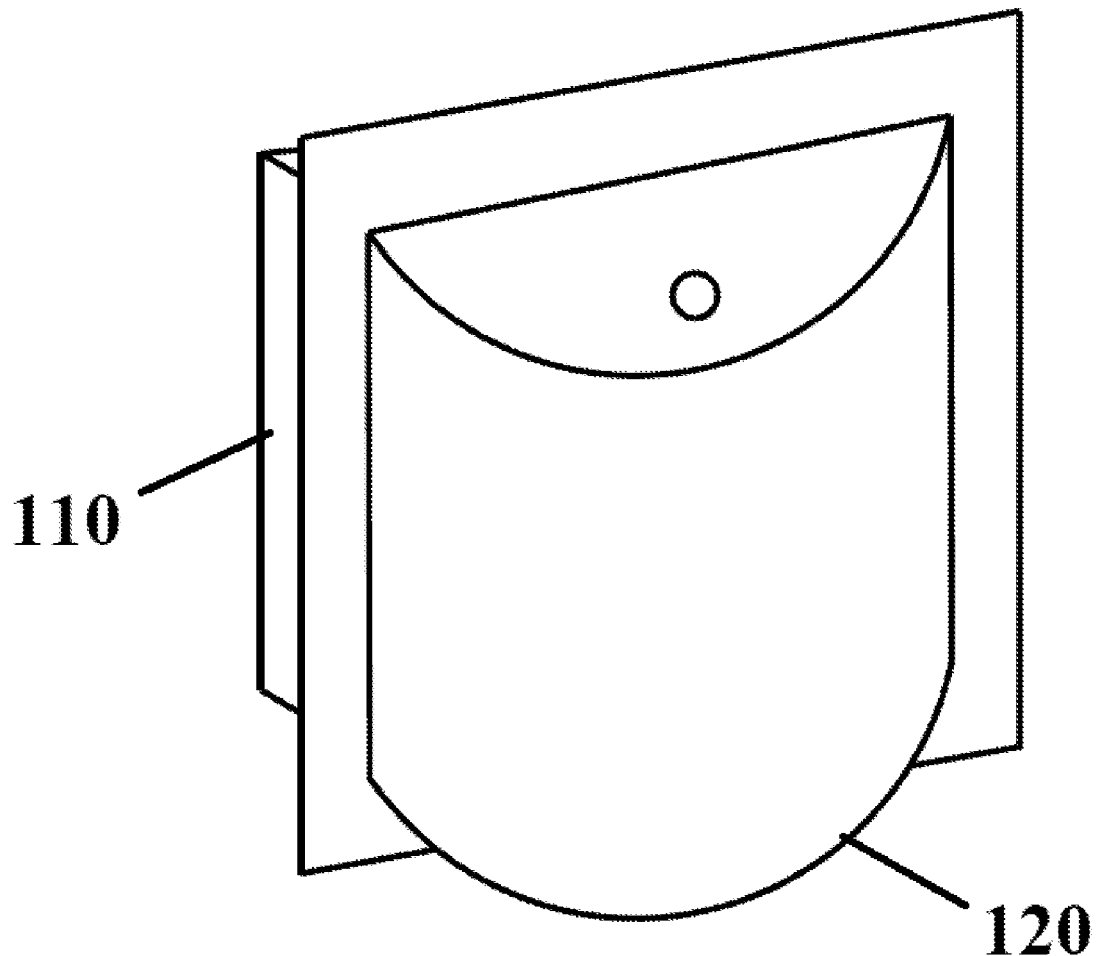
FIG. 1 is an interior component of one embodiment of the present invention, prior to installation.

In some embodiments, as seen in FIG. 1, the interior component 100 includes an inner frame that fits within the opening in the wall/door and a bird feeder housing 120 that extends from the inner frame 110 toward the inside of the home in which the bird feeder is installed. In some such embodiments the bird feeder housing 120 and inner frame 110 are integral with one another. In other embodiments, the bird feeder housing 120 is removable from the inner frame 110, such that multiple different bird feeder housings of varying shapes and sizes are capable of being attached to the inner frame 110.

In some embodiments, the bird feeder housing 120 includes an hinged lid, door, or other openable section in the housing to allow a user to access the interior of the bird feeder housing from inside the home for cleaning and/or adding food/water to the feeder.

In some embodiments, the bird feeder housing 120 includes at least a portion of the housing walls that are at least partially transparent to allow a user to see through the wall to watch birds while they are using the feeder. In some embodiments the entirety of the walls of the bird feeder are at least partially transparent. In some embodiments, the walls (or the at least partially transparent portion(s) of the walls) are tinted or mirrored (like a two way mirror) to minimize the likelihood that a bird using he feeder will see a person inside the home watching the bird and thus be frightened away.

Figure 2:
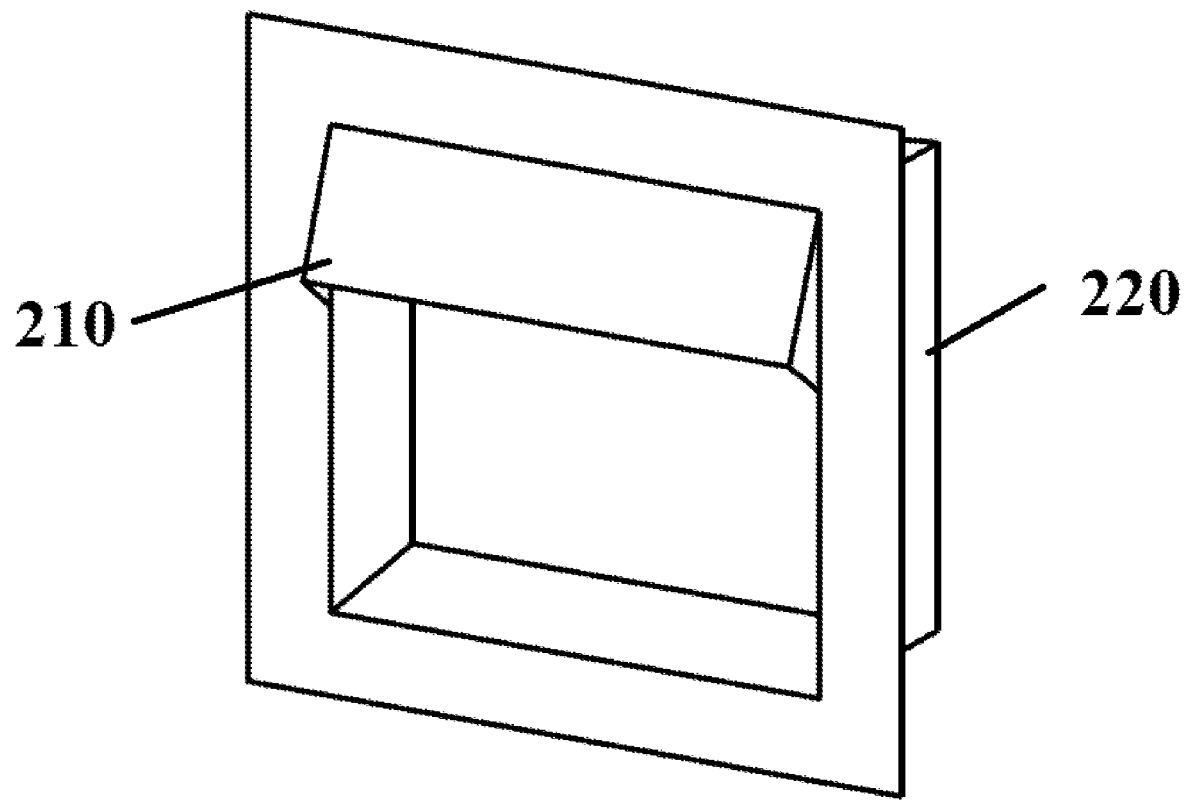
FIG. 2 is an exterior component of one embodiment of the present invention, prior to installation.
Figure 3:
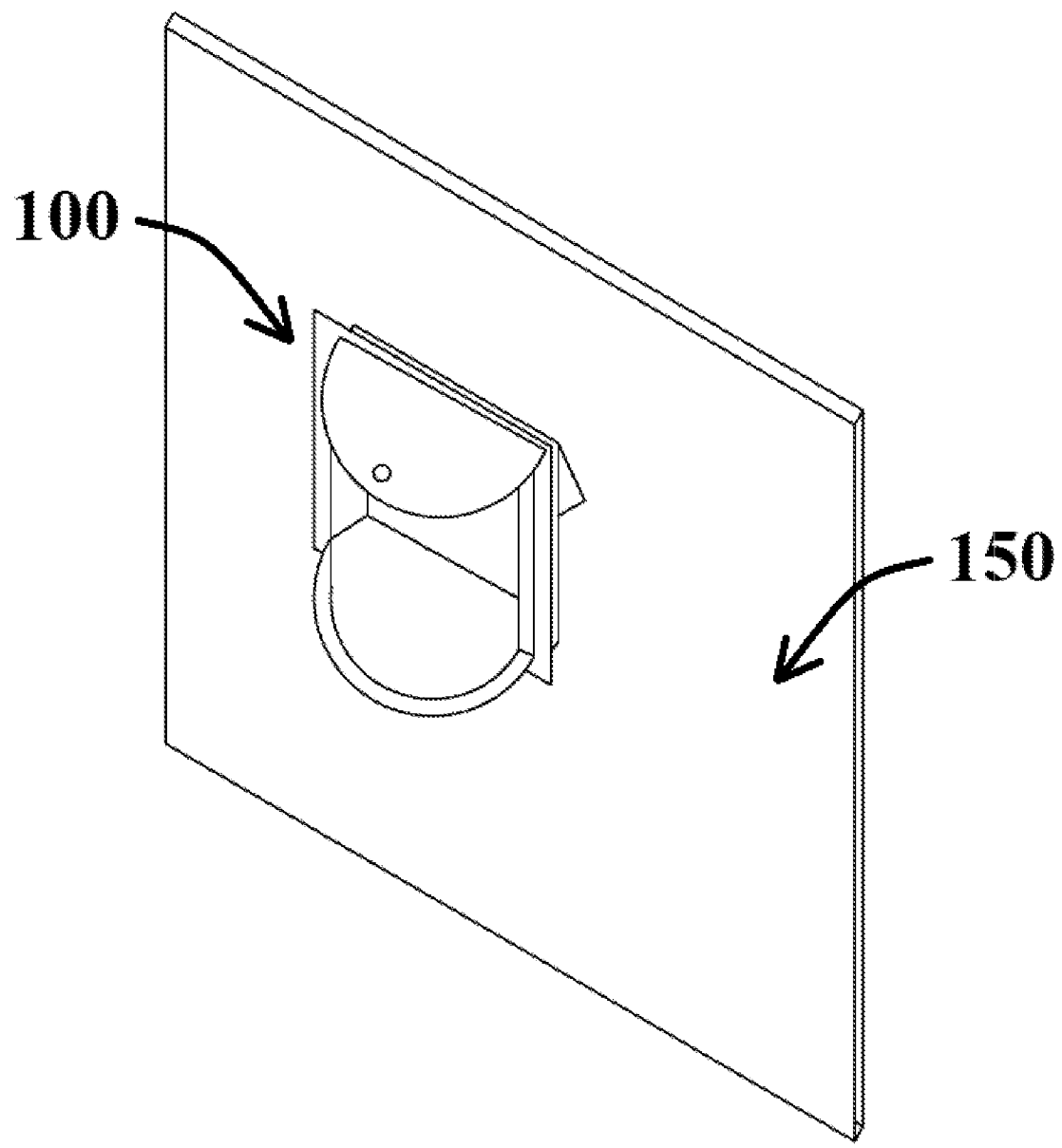
FIG. 3 is an interior component of one embodiment of the present invention, after installation.
Figure 4:
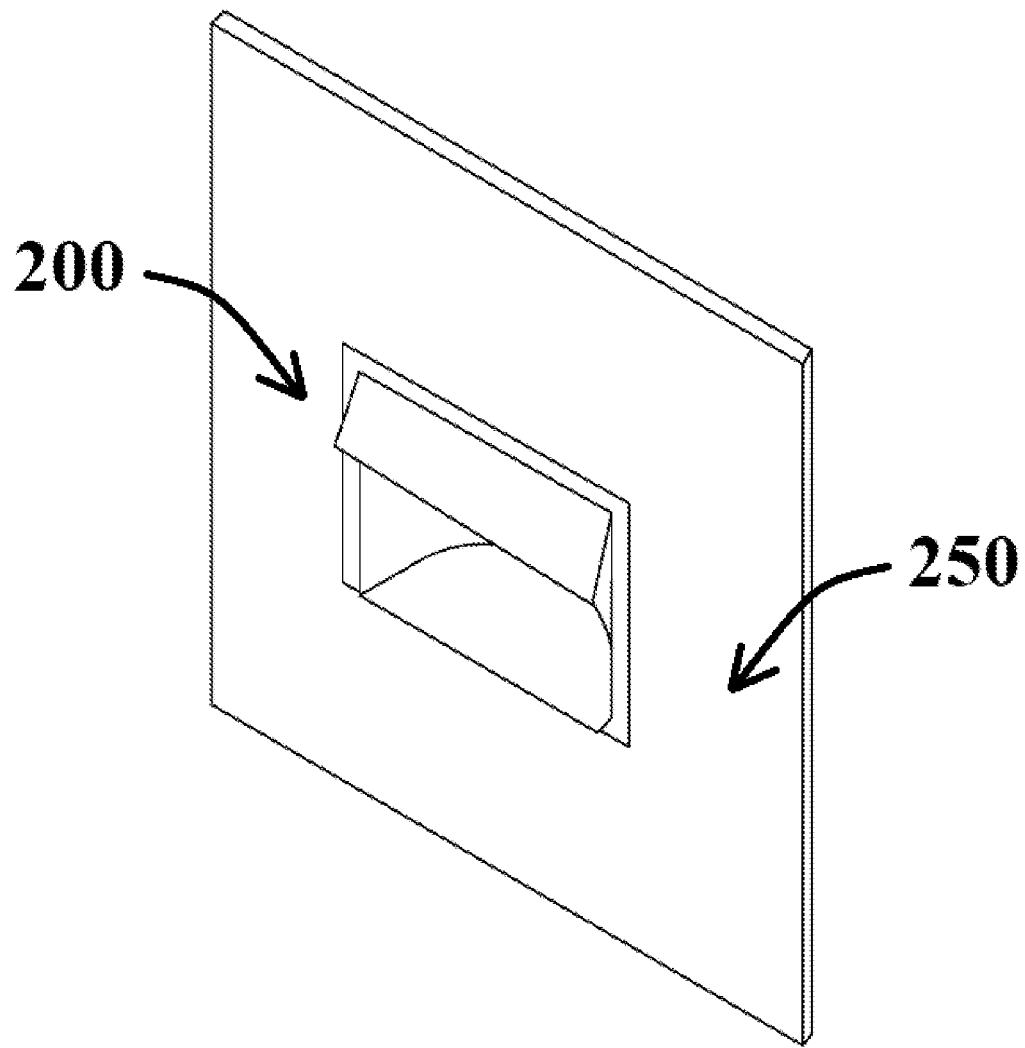
FIG. 4 is an exterior component of one embodiment of the present invention, after installation.

In some embodiments, as seen in FIG. 2, the exterior component 200 comprises an outer frame 210 that fits within the opening in the wall/door and connects to the inner frame 110. In some such embodiments, the frame includes a hood section 220 to deflect water from the exterior wall 250 so as to reduce the likelihood of entering the bird feeder and/or the home.

In some embodiments a mounting kit includes a template for cutting a hole in the wall/door and properly mounting/installing the bird feeder of the present invention. In some embodiments flashing, weather stripping and/or other framing components are included with the bird feeder of the present invention to ensure proper fit and weather sealing during installation.

In some embodiments, the shapes of the inner frame 110 and outer frame 210 may be another shape, such as circular, pentagonal, hexagonal, or another shape. In some embodiments, the interior component 100 may be mounted on the outside portion 250, with the exterior component 200 being mounted on the inside portion 150. In some embodiments, the bird feeder of the present invention may be installed on additional surfaces, such as a ceiling, floor, or other surface.

The foregoing and other objects are intended to be illustrative of the present invention and are not meant in a limiting sense. Many possible embodiments of the present invention may be made and will be readily evident upon a study of the specification and accompanying drawings comprising a part thereof. Various features and subcombinations of the present invention may be employed without reference to other features and subcombinations. Other objects and advantages of the present invention will become apparent from the following description taken in connection with the accompanying drawings, wherein is set forth by way of illustration and example, an embodiment of the present invention and various features thereof.

The invention claimed is:

1. A bird feeder system, comprising:
   an interior component including an inner frame adapted to fit within an opening in a solid surface; and
   an exterior component including an outer frame adapted to fit within an opening in a solid surface;
   wherein said interior component and said out component are adapted for connecting together; and
   where said exterior component includes a hood section.

2. The system of claim 1, wherein said interior component further includes a bird feeder housing extending from the inner frame.

3. The system of claim 2, wherein said bird feeder housing is transparent.

4. The system of claim 2, wherein said bird feeder housing is tinted.

5. A bird feeder installation method, comprising:
   creating an opening in a solid surface;
   attaching an interior component to a first side of the solid surface by fitting an inner frame of the interior component within said opening;
   attaching an exterior component to a second side of the solid surface by fitting an outer frame of the exterior component within said opening; and
   connecting the interior component and exterior component together;
   wherein said exterior component includes a hood section.

6. The method of claim 5, wherein said interior component further includes a bird feeder housing extending from the inner frame.

7. The method of claim 6, wherein said bird feeder housing is transparent.

8. The method of claim 6, wherein said bird feeder housing is tinted.

* * * * *